(No Model.)

O. BILLINGSLEY.
CORN ROW MARKER.

No. 589,808. Patented Sept. 14, 1897.

WITNESSES
J. Frank Culverwell
A. M. Poynton

INVENTOR
Omer Billingsley.
By John Wedderburn
Attorney

UNITED STATES PATENT OFFICE.

OMER BILLINGSLEY, OF EAST CAPE GIRARDEAU, ILLINOIS.

CORN-ROW MARKER.

SPECIFICATION forming part of Letters Patent No. 589,808, dated September 14, 1897.

Application filed January 19, 1897. Serial No. 619,740. (No model.)

*To all whom it may concern:*

Be it known that I, OMER BILLINGSLEY, a citizen of the United States, residing at East Cape Girardeau, in the county of Alexander and State of Illinois, have invented certain new and useful Improvements in Corn-Row Markers; and I do hereby declare the following to be a full, clear, and exact description of the invention, such as will enable others skilled in the art to which it appertains to make and use the same.

My invention relates to improvements in corn-row markers; and it consists of certain novel constructions, combinations, and arrangements of parts, all of which will be hereinafter more particularly set forth and claimed.

Figure 1:
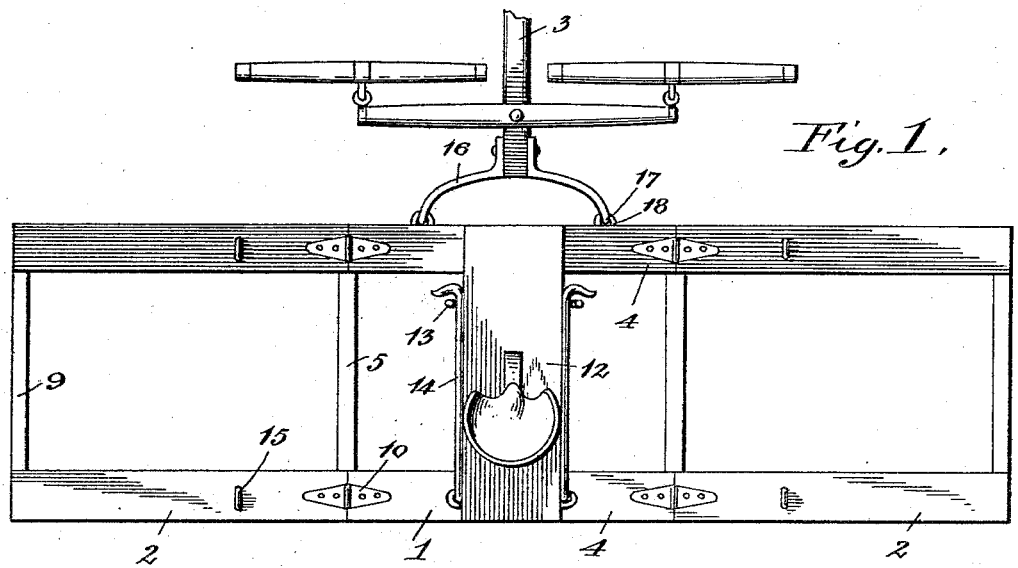
Figure 2:
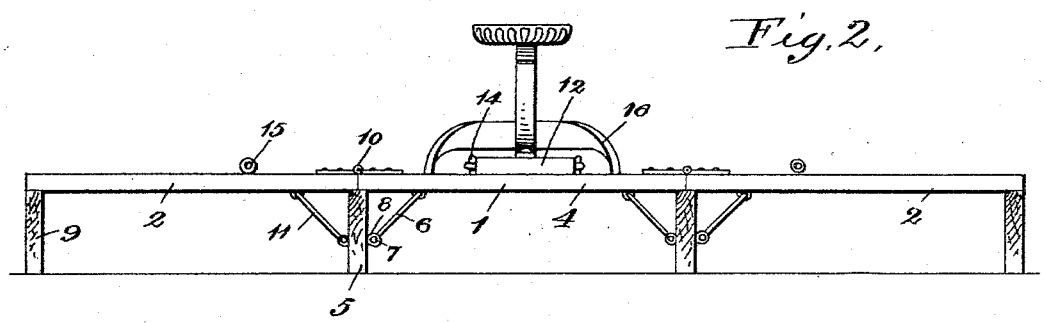
Figure 3:
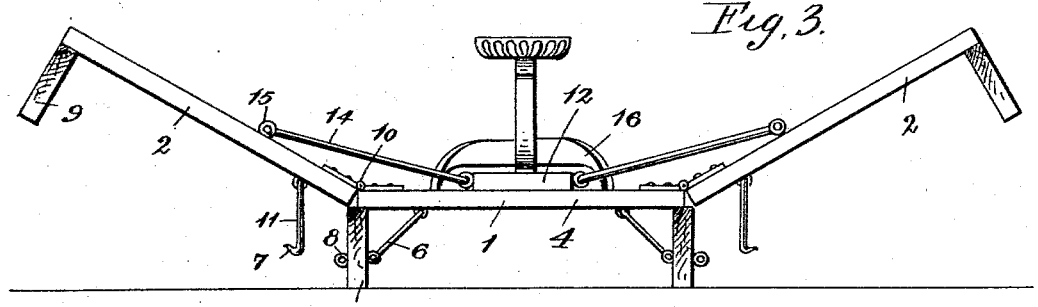

In the accompanying drawings, forming a part of this specification, Figure 1 represents a top plan view of a marker embodying my invention, the auxiliary hinged frames being extended into their operative position. Fig. 2 represents a rear elevation of the same, and Fig. 3 represents a rear elevation with the auxiliary frames raised.

1 in the drawings represents the main frame, 2 2 the auxiliary hinged frames, and 3 the tongue or pole. Said frame 1 comprises two cross-bars 4 4, spaced and connected by markers 5, situated at the respective ends of the same and occupying a vertical position, as shown in Fig. 2 in the drawings. Said markers 5 are held rigidly in their proper positions by braces 6, secured to the under side of the portions 4 and provided with hooks 7, adapted to pass through eyes 8, secured to said markers 5. The auxiliary frames 2 are similar to the frame 1 with the exception that they are only provided with one marker 9, connected to their outer ends, the inner ends of said frames being hinged to the frame 1 by hinges 10. Said frames 2 are further provided with brace-bars 11, similar to the bar 6, and provided with hooks adapted to engage eyes upon the markers 5 in a similar manner to the rod 6. The office of these rods 11 is to hold down the auxiliary frames in their operative positions. The portions 4 4 of the frame 1 are connected at their middles by a cross-piece 12, on which are mounted a stop 13 and pivoted rods 14, having suitable hooks at their ends, whereby they may be passed through eyes 15 upon the frames 2 when the latter are raised, and thus hold said frames in their elevated inoperative positions. These frames 2 are held up in this position when it is desired to mark two rows only. The pole 3 is provided with suitable single and double trees, and is detachably secured to the front of the frame 1 by castings 16, secured upon the opposite sides of said pole and provided at their inner ends with hooks 17, adapted to enter suitable eyes 18, secured upon said frame 1.

It will be observed from the foregoing description that the markers 5 and 9 extend the entire distance between the respective front and rear portions of the frame, and thus effectively prepare the soil in a manner well known in the art. It will further be observed that my improved marker may be converted to either a two or four row marker at will by simply raising or lowering the auxiliary frames, as before described.

Having thus described my invention, what I claim as new, and desire to secure by Letters Patent, is—

1. In a corn-row marker, the combination with the main frame having a draft-tongue and pendent markers, of auxiliary frames hinged to said main frame and also provided with markers, rods having hook ends and pivotally connected to the under sides of the auxiliary frames, and screw-eyes secured to the sides of the markers of the main frame and adapted to be engaged by the hooks of the rods to hold the auxiliary frames down in their operative position to permit of their being raised at will, substantially as described.

2. In a corn-row marker, the combination with the main frame having a draft-tongue and pendent markers, of rigid inclined braces connecting said main frame and markers, auxiliary frames hinged to said main frame and also provided with markers, a plurality of rods hinged on the main frame and provided with hook ends, and screw-eyes mounted upon the auxiliary frames and adapted to be engaged by the hooked rods to hold said auxiliary frames in their elevated positions to permit of their being lowered at will, substantially as described.

In testimony whereof I have signed this specification in the presence of two subscribing witnesses.

OMER BILLINGSLEY.

Witnesses:
BERNHARD BAHN,
MARTIN C. DANES.